US012205179B2

(12) United States Patent
McHugh (10) Patent No.: US 12,205,179 B2
(45) Date of Patent: Jan. 21, 2025

(54) NON-GRID ENERGY MARKETPLACE SYSTEM AND METHOD (71) Applicant: Patrick Joseph McHugh, Providence, RI (US)

(72) Inventor: Patrick Joseph McHugh, Providence, RI (US)

(*) Notice: Subject to any disclaimer, the term of this patent is extended or adjusted under 35 U.S.C. 154(b) by 0 days.

(21) Appl. No.: 17/572,739

(22) Filed: Jan. 11, 2022

(65) Prior Publication Data
US 2022/0222756 A1 Jul. 14, 2022

Related U.S. Application Data (60) Provisional application No. 63/205,827, filed on Jan. 11, 2021.

(51) Int. Cl.
G06Q 50/06 (2024.01)
G06Q 30/02 (2023.01)
H02J 3/38 (2006.01)
G06Q 30/0235 (2023.01)

(52) U.S. Cl.
CPC ......... G06Q 50/06 (2013.01); G06Q 30/0278 (2013.01); H02J 3/381 (2013.01); G06Q 30/0235 (2013.01); H02J 2300/24 (2020.01)

(58) Field of Classification Search
None
See application file for complete search history.

(56) References Cited

U.S. PATENT DOCUMENTS

| 7,970,674 | B2 | 6/2011 | Cheng et al. |
| 9,547,026 | B1 | 1/2017 | Chraim et al. |
| 9,605,704 | B1 | 3/2017 | Humphries et al. |
| 9,819,219 | B2* | 11/2017 | Annavajjhala ........ H02J 7/0024 |
| 10,896,449 | B2 | 1/2021 | Ma et al. |
| 11,244,361 | B2 | 2/2022 | Humphries et al. |
| 2002/0132144 | A1* | 9/2002 | McArthur ............. G06Q 30/06 429/513 |
| 2007/0198278 | A1 | 8/2007 | Cheng et al. |
| 2008/0167756 | A1* | 7/2008 | Golden ................... G05F 1/66 700/297 |
| 2012/0143383 | A1* | 6/2012 | Cooperrider ........... F21S 8/086 700/295 |

(Continued)

FOREIGN PATENT DOCUMENTS

WO 2018184076 10/2018

Primary Examiner — William J Jacob
(74) Attorney, Agent, or Firm — Onello & Mello, LLP (57) ABSTRACT A non-grid energy marketplace system is provided for at least one unit, e.g., a dwelling, building, or other structure that shelters an entity such as a person, family, or business that consumes energy. The system comprises at least one gateway coupled to a plurality of sensors configured to collect time-series energy data for each unit at a site that has at least one non-grid energy system. The time-series energy data can include unit-level non-grid energy consumption data and, if available, unit-level grid energy consumption data. An energy information processor is configured to communicate with at least one gateway via a remote network to receive and process the time-series energy data to determine time-based non-grid energy consumption for each unit. The system can be configured to perform a non-grid energy marketplace method that carries out the above processes and functions.

20 Claims, 4 Drawing Sheets (56) References Cited

U.S. PATENT DOCUMENTS

| | | | |
|---|---|---|---|
| 2015/0066228 A1* | 3/2015 | Clifton | H02J 13/00034 700/295 |
| 2015/0108839 A1* | 4/2015 | Annavajjhala | H02J 7/0029 29/825 |
| 2015/0379588 A1 | 12/2015 | Ma et al. | |
| 2016/0099571 A1* | 4/2016 | Gelonese | H02J 3/381 307/23 |
| 2016/0117657 A1* | 4/2016 | Forbes, Jr. | G06Q 20/145 705/7.31 |
| 2016/0377306 A1* | 12/2016 | Drees | H02J 3/28 700/295 |
| 2017/0358041 A1* | 12/2017 | Forbes, Jr. | G05D 3/12 |
| 2018/0084627 A1* | 3/2018 | Recker | H02J 7/34 |
| 2019/0005553 A1 | 1/2019 | Humphries et al. | |

* cited by examiner

NON-GRID ENERGY MARKETPLACE SYSTEM AND METHOD

CROSS REFERENCE TO RELATED APPLICATIONS

The present application claims priority under 35 USC 119(e) to U.S. Provisional Applicant No. 63/205,827, entitled Non-Grid and Hybrid Sourced Energy Marketplace, and filed on Jan. 11, 2021, the contents of which are incorporated herein by reference in its entirety.

FIELD OF INTEREST

The present inventive concepts relate to the field of energy, and particularly to the field of non-grid energy and its production, optimization of use and distribution, and monetization, particularly in view of and/or in combination with energy provided via the traditional energy grid.

BACKGROUND

Non-grid energy production, such as home-based solar energy production, has grown in popularity as overall system costs have dropped and viable use cases have increased. Solutions currently exist to help design, plan, and execute the construction and operation of a non-grid energy production solution. However, with current approaches, operators have limited visibility into individual community member usage of their non-grid power (if quantities are not pre-allocated) and, thus, lose flexibility in optimizing solution deployments through cost-effective, real-time allocation of energy production to member energy demand, available storage, and grid energy overflows/requests. Operators also have limited ways to effectively share assets with other operators to optimize overall infrastructure financial performance and efficiency.

Current energy consumption tracking systems focus on providing insight into overall non-grid energy production, overall consumption, or details on the consumption of individual breakers/circuits within a unit. A gap exists in translating this data into a meaningful source and sink analysis to provide operators of non-grid energy with insight into exact usage of their non-grid and associated grid energy by individual community members at a unit level to allow for accurate cost allocation and billing.

It would be advantageous to provide a system and method that could collect and analyze non-grid energy utilization information, particularly on the basis of time, to determine at least consumption and demand at the unit level. It would be further advantageous to provide an Internet or Web-based system and method that collects and analyzes non-grid energy at least consumption and demand information across and for a plurality of units. It would be further advantageous to provide a system and method that can track, monitor, assess, and value non-grid energy source equipment and, optionally, create a market for such equipment. Other advantages can be provided by such a system and method, as will be appreciated by those skilled in the art having the benefit of the disclosure provided herein.

SUMMARY

The inventive concepts pertain to hardware, software and services that facilitate non-grid energy production, optimization of use and distribution, and, optionally, monetization and investment. In accordance with the inventive concepts, the application of hardware, software and services enable operators and community members to associate energy assets, production, and distribution of grid and non-grid energy to individual community members and other operators. The foregoing can be referred to as a non-grid energy marketplace system and method.

A system and method in accordance with the inventive concepts is configured for evaluating, tracking, managing and valuing energy assets related to energy use by community members, termed a "marketplace." The marketplace is comprised of hardware sensors and software, a backend system for aggregating and analyzing energy sources and uses both behind-the-grid and in-front-of-the-grid resources, and a software application for community member use. The system can also include low cost easy to deploy Internet of things (IoT) assets to allow for easy in-situ evaluation and validation of deployment potential prior to full scale execution. The system can include a marketplace platform configured for accurate tracking and payment of energy and asset use. The system can be configured to provide non-grid energy community members and operators with insight into the sources and sinks of power within the community driving communications and actions to improve overall system efficiencies. The system can also be configured to provide automatic, real-time valuation of sources and assets to facilitate source and marketplace asset transfers.

In accordance with one aspect of the inventive concepts, provided is a non-grid energy marketplace system, comprising: at least one gateway coupled to a plurality of sensors configured to collect time-series energy data for each unit at a site that has at least one non-grid energy system, the time-series energy data including unit-level non-grid energy consumption data and, if available, unit-level grid energy consumption data; and an energy information processor configured to communicate with at least one gateway either via on premise or via remote network to receive and process the time-series energy data to determine time-based non-grid energy consumption for each unit. The placement of the energy information processor in all following references can be physically located as so specified here, or otherwise.

In various embodiments, the plurality of sensors includes current transformer (CT) sensors, voltage sensors, and/or magnetic field sensors.

In various embodiments, the plurality of sensors includes at least one sensor at an output of the non-grid energy system and at least one sensor on each leg coupling a main distribution panel to a unit electric panel for each unit at the site.

In various embodiments, the energy information processor is further configured to process the time-series energy data to determine time-series non-grid energy production for at least one non-grid energy system.

In various embodiments, the energy information processor is further configured to process the time-series energy data to determine non-grid energy consumption and grid energy consumption on a temporal unit-level basis.

In various embodiments, the energy information processor is further configured to communicate with a plurality of gateways, each gateway coupled to a plurality of sensors configured to collect time-series energy data for each unit at a different site having a non-grid energy system and determine valuations of non-grid energy assets of the non-grid energy systems.

In various embodiments, the energy information process is further configured to determine the valuations of the non-grid energy assets from a plurality of types of asset information, including an asset's hardware components, age, production history, and consumption history.

In various embodiments, the energy information processor is further configured to establish an on-line marketplace that enables electronic transactions for purchase, sale, and/or investment in the non-grid energy assets.

In various embodiments, the energy information processor is further configured to communicate with a plurality of gateways, each gateway coupled to a plurality of sensors configured to collect time-series energy data for each unit at a different site having a non-grid energy source, determine time series non-grid energy production for each site and unit-level time series energy consumption at each site, and determine time-sensitive non-grid energy pricing based on the time series non-grid energy production for each site and the unit-level time series energy consumption at each site.

In various embodiments, the energy information processor is further configured to provide a non-grid energy marketplace for energy consumers that allows the energy consumers to reserve certain discounted power rates for specific times and quantities.

In accordance with another aspect of the inventive concepts, provided is a non-grid energy marketplace method, comprising: at least one gateway collecting time-series energy data from a plurality of sensors for each unit at a site that has at least one non-grid energy system, the time-series energy data including unit-level non-grid energy consumption data and, if available, unit-level grid energy consumption data; and an energy information processor communicating with the at least one gateway via a remote network and processing the time-series energy data to determine time-based non-grid energy consumption for each unit.

In various embodiments, the plurality of sensors includes current transformer (CT) sensors, voltage sensors, and/or magnetic field sensors.

In various embodiments, the plurality of sensors includes at least one sensor at an output of the non-grid energy system and at least one sensor on each leg coupling a main distribution panel to a unit electric panel for each unit at the site.

In various embodiments, the method includes energy information processor processing the time-series energy data to determine time-series non-grid energy production for the at least one non-grid energy system.

In various embodiments, the method includes the energy information processor processing the time-series energy data to determine non-grid energy consumption and grid energy consumption on a temporal unit-level basis.

In various embodiments, the method includes the energy information processor: communicating with a plurality of gateways, each gateway coupled to a plurality of sensors configured to collect time-series energy data for each unit at a different site having a non-grid energy system; determining valuations of non-grid energy assets of the non-grid energy systems.

In various embodiments, the method includes the energy information processor determining the valuations of the non-grid energy assets from a plurality of types of asset information, including an asset's hardware components, age, production history, and consumption history.

In various embodiments, the method includes the energy information processor establishing an on-line marketplace that enables electronic transactions for purchase, sale, and/or investment in the non-grid energy assets.

In various embodiments, the method includes the energy information processor: communicating with a plurality of gateways, each gateway coupled to a plurality of sensors configured to collect time-series energy data for each unit at a different site having a non-grid energy source; determining time series non-grid energy production for each site and unit-level time series energy consumption at each site; and determining time-sensitive non-grid energy pricing based on the time series non-grid energy production for each site and the unit-level time series energy consumption at each site.

In various embodiments, the method includes the energy information processor providing a non-grid energy marketplace for energy consumers that enables the energy consumers to reserve certain discounted power rates for specific times and quantities.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Various aspects of the inventive concepts will be described more fully hereinafter with reference to the accompanying drawings, in which some exemplary embodiments are shown. The present inventive concepts may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

The terminology used herein is for the purpose of describing particular embodiments only and is not intended to be limiting of the inventive concepts. For the purposes of their use in this application, the following terms are defined as follows: "hybrid energy source" provides energy from both grid and non-grid sources; "energy marketplace gateway" (also referred to as "marketplace") comprises all hardware, software, and services that enable the accurate tracking of energy sources and uses at the energy, financial, and asset levels of analysis to community members and other interested parties with which it is shared; "operator" is a provider of non-grid energy (via production, batteries, and/or distribution agreements, as examples), the marketplace and other supporting resources; "community members" are consumers of operator and grid provided energy; "unit(s)" are locations where community members consume energy resources (both-in-front-of and behind-the meter dwellings, commercial real estate sites, charging stations, and/or grid energy providers, as examples); "non-grid energy" is any energy source that is not directly flowing from the grid energy provider at time of community member use; "behind-the-meter" refers to assets and energy production located after a unit's grid provided meter; "in front-of-the-meter" refers to assets and energy production located before a unit's grid provided meter; "source" refers to an energy source, where there can be different types of sources (e.g., grid, non-grid, storage, behind-the-meter, in front-of-the-meter, battery or other storage, and/or on-demand generation, as examples); "asset" refers to hardware, software, and systems used to generate and/or store non-grid energy. "Internet-of-things" or (IoT) refers to everyday computing devices interconnected via the Internet, enabling them to send and receive data.

Except as defined in the previous paragraph, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In accordance with aspects of the inventive concepts, provided is a non-grid energy system and method. In accordance with aspects of the inventive concepts, tracking of energy assets, energy production, energy storage, and distribution of both grid and non-grid energy to individual community member units can be provided, where the community can include operators and energy consumers or, in particular, non-grid energy consumers. The system can provide a platform to manage billing and payments associated with each unit/community member, and a module or subsystem for enabling financial management related to non-grid energy assets, and the sharing of use thereof among operators for financial benefit. The system can comprise a plurality of processors and memory storage devices that are collocated or distributed within the Internet and World Wide Web, or "the cloud." As a system that can utilize distributed processing and memory storage, the system can leverage the IoT for information gathering and processing.

Figure 1:
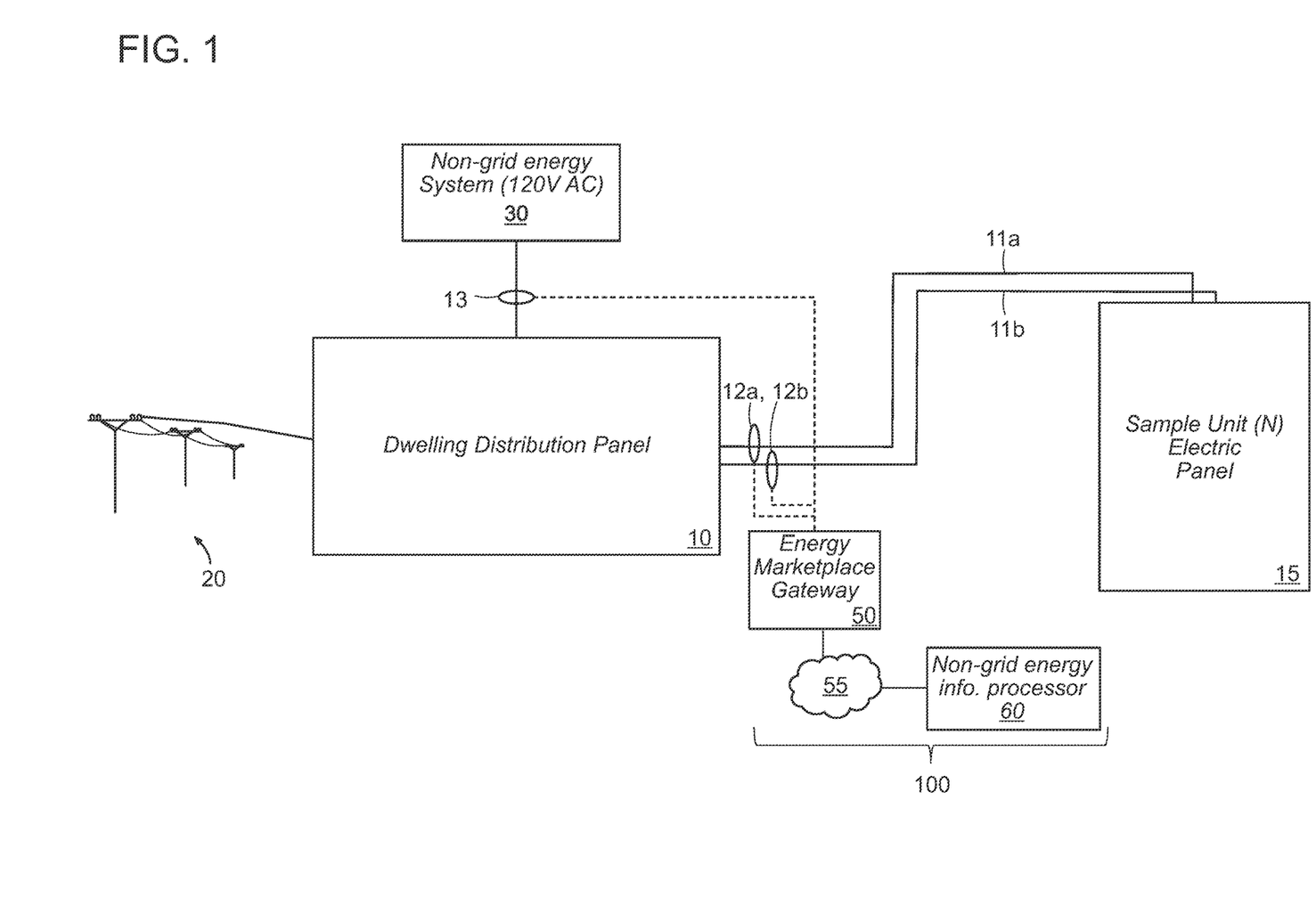
FIG. 1 is an embodiment of a non-grid energy system within the context of a hybrid energy system, in accordance with aspects of the inventive concepts.

FIG. 1 is a relatively simplified or straightforward embodiment of a non-grid energy marketplace system 100 and the various systems and sources with which it interfaces, in accordance with aspects of the inventive concepts. In various embodiments, the non-grid energy marketplace system 100 includes an energy information gateway 50 coupled to a set of sensors that collect time-series (or temporal) energy information for units at a site and also includes a remote energy information (or marketplace) processor 60. The remote energy information (or marketplace) processor 60 can host and/or implement a marketplace platform for the exchange of information and the conduct of transactions among a community that includes non-grid energy system operators and consumers, as well as others.

The site (e.g., multi-unit dwelling) is presumed to have at least one non-grid energy source and the energy information processor is configured to process the energy information to at least determine time-based non-grid energy consumption at the unit level for the site, where a unit can be one dwelling in a multi-unit or multi-dwelling building or complex. The energy information processor can store and/or represent the unit-level non-grid energy consumption for a unit as a non-grid energy consumption (or load) profile depicting non-grid energy use versus time as a continuous or discrete function. The profile could optionally include grid energy use and/or total energy use, in a hybrid energy arrangement. Note, a hybrid energy arrangement is typical, but the inventive concepts could be applied when no traditional grid energy is available.

The non-grid energy marketplace system 100 can be used in various configurations where at least one non-grid energy source is used in combination with a traditional grid energy source, i.e., the hybrid energy arrangement. Non-grid energy systems, such as residential non-grid energy systems, can include solar panels (e.g., solar roof tiles), residential wind turbines, geothermal heat pumps, micro-hydroelectricity systems, and/or combinations of two or more thereof.

The non-grid energy marketplace system 100 can be utilized in a single-unit configuration or in a multi-unit configuration. In some embodiments, a single-unit configuration could be a single-family home, also referred to as a single-family dwelling, or other structure that shelters a single entity, e.g., person, family, group, or business. A multi-unit configuration could be a building or development that shelters more than one entity. Examples of types of multi-unit configurations could be a multi-unit dwelling, an office building, an office park, or a campus of buildings, e.g., for a company, government entity, hospital, or university. In some embodiments, a multi-unit dwelling could be an apartment building or complex, a multi-family home, or a co-op or condo building or complex. The inventive concepts are not limited to the particular uses of the unit, and can be applied to an aggregation of a plurality of types of units, e.g., single-unit and/or multi-unit configurations.

In various embodiments, the non-grid energy marketplace system 100 includes an energy marketplace gateway 50 that communicates with and/or includes a sensor setup. The sensor setup can include a plurality of sensors variously connected to determine non-grid production and usage, as well as grid usage. The sensors can include, but are not limited to, current transformer (CT) sensors, voltage sensors, and/or magnetic field sensors.

The non-grid energy marketplace system 100 can be implemented, at least in part, at the distribution box (e.g., in a non-exclusive hardware placement) and can be installed in a 2N+1 deployment of voltage and/or current sensors, where N is the number of units in a multi-unit arrangement. The details provided in this description assume units with a single phase, 2-leg, 120V AC (alternating current) power connection, but embodiments can be modified to accommodate other designs (3-phase, etc.). In the embodiment of FIG. 1, each unit has 2 current sensors 12a, 12b, one for each 120V leg 11a, 11b, while the non-grid energy system 30 also has a sensor 13, e.g., a current sensor. In various embodiments, one volt meter can be used to measure voltage from the non-grid energy system 30 and other sensors can be added at each unit to accurately determine voltage or current values from each leg of each unit.

A dwelling may include N units having access to grid 20 and non-grid energy 30, where N≥1. In a single unit configuration, N=1 and in a multi-unit configuration N>1. In the embodiment of FIG. 1, a distribution panel 10 at the site receives electrical power from the traditional grid 20 and from at least one non-grid system 30, e.g., a local solar panel system. A solar panel system typically includes a plurality of solar panels potentially connected to at least one battery that stores electrical power. The battery or batteries are electrically coupled to the distribution panel 10 for use by the unit or units, as shown in FIG. 1.

In embodiment of FIG. 1, a unit electric panel 15 is shown. In a multi-unit configuration or dwelling, each unit could have its own electric panel, each being fed by the distribution panel 10. For example, a multi-unit dwelling could have twenty units, where N=20 and there can be twenty unit electric panels 15, with 2N+1 sensors. The grid source 20 and the non-grid system(s) 30 send electrical power into the distribution panel 10 for use by the N units via, in this embodiment, the two 120V AC legs 11a, 11b and the electric panel 15.

In this embodiment, sensor 13, which can be a current sensor, is arranged and configured to sense electric power (or current) output from the non-grid system 30 into the distribution panel 10. Sensors 12a, 12b are placed on each leg 11a, 11b, respectively, out of the distribution panel 10 to sense consumption by the unit served by the electric panel 15. In various embodiments, sensors 12a, 12b can be, for example, current sensors. In other embodiments, sensors 12a, 12b, and/or 13 can be any other type of sensor configured to sense and/or measure electric energy and/or current.

The sensors 12a, 12b, and 13 are coupled to the energy marketplace gateway 50, which communicates with a remote non-grid energy information processor 60 via the Internet/World Wide Web 55. Together, at least one energy marketplace gateway 50 in communication with the remote non-grid energy information processor 60 can be referred to or form a non-grid energy marketplace system 100. In some embodiments, a plurality of energy marketplace gateways 50 are in communication with remote non-grid energy information processor 60.

In preferred embodiments, the energy marketplace gateway 50 collects time-series (or temporal) energy production data for non-grid energy system 30 via sensor 13 and collects time-series (or temporal) energy consumption data of both non-grid and grid energy by via sensors 12a, 12b at the unit level (for electric panel 15). Therefore, the collected time-series energy data for each unit at a site that has at least one non-grid energy source can include unit-level non-grid energy consumption data and, if available, unit-level grid or total (hybrid) energy consumption data, as well as non-grid energy production data.

The sensor data collected and analyzed by the marketplace gateway 50 and the energy information processor 60 can include main-line voltages, current, phase, and other metrics needed for the accurate calculation of energy flow through power lines or other electrical transmission equipment. Grid energy can be determined as the difference between total (or hybrid) electric power consumption determined from sensors 12a, 12b less the input non-grid energy sensed via sensor 13.

Therefore, in various embodiments, the energy marketplace gateway 50 is configured to perform time series data collection as it collects and aggregates data from the various sensors 12a, 12b, and 13, which it can do for multiple units simultaneously. The energy marketplace gateway 50 also includes a communication interface configured to access and communicate via the Internet and World Wide Web, and the "Internet of things" (IoT). In other embodiments, other forms of now known or later developed communication could be used.

The non-grid energy information processor 60 communicates with the energy marketplace gateway 50 via the Internet, in various embodiments, so that the non-grid energy information processor 60 can receive the collected time-series data from the energy marketplace gateway 50 and process the collected time-series data for various uses. In various embodiments, the non-grid energy processor 60 can be configured to communicate with and receive time-series energy consumption data and/or non-grid energy production data from a plurality of energy marketplace gateways 50, e.g., at different sites or geographic locations.

In various embodiments, with information about a multi-unit's non-grid energy use and/or production, including details on the quantity and timing of the energy production, the non-grid energy information processor 60 combines this information with individual units' consumption to determine the total power consumption at an individual unit level and associates the consumed energy sourcing. The unit-level non-grid energy consumption data can be stored and/or represented as a unit-level non-grid energy consumption profile. Data from a plurality of profiles, e.g., within a building, complex, campus, or region, can be aggregated and, optionally, stored and/or represented as an aggregate non-grid energy consumption profile. Additionally, or alternatively, hybrid energy consumption information or profiles could be represented in the non-grid energy or hybrid energy consumption profiles.

Figure 2:
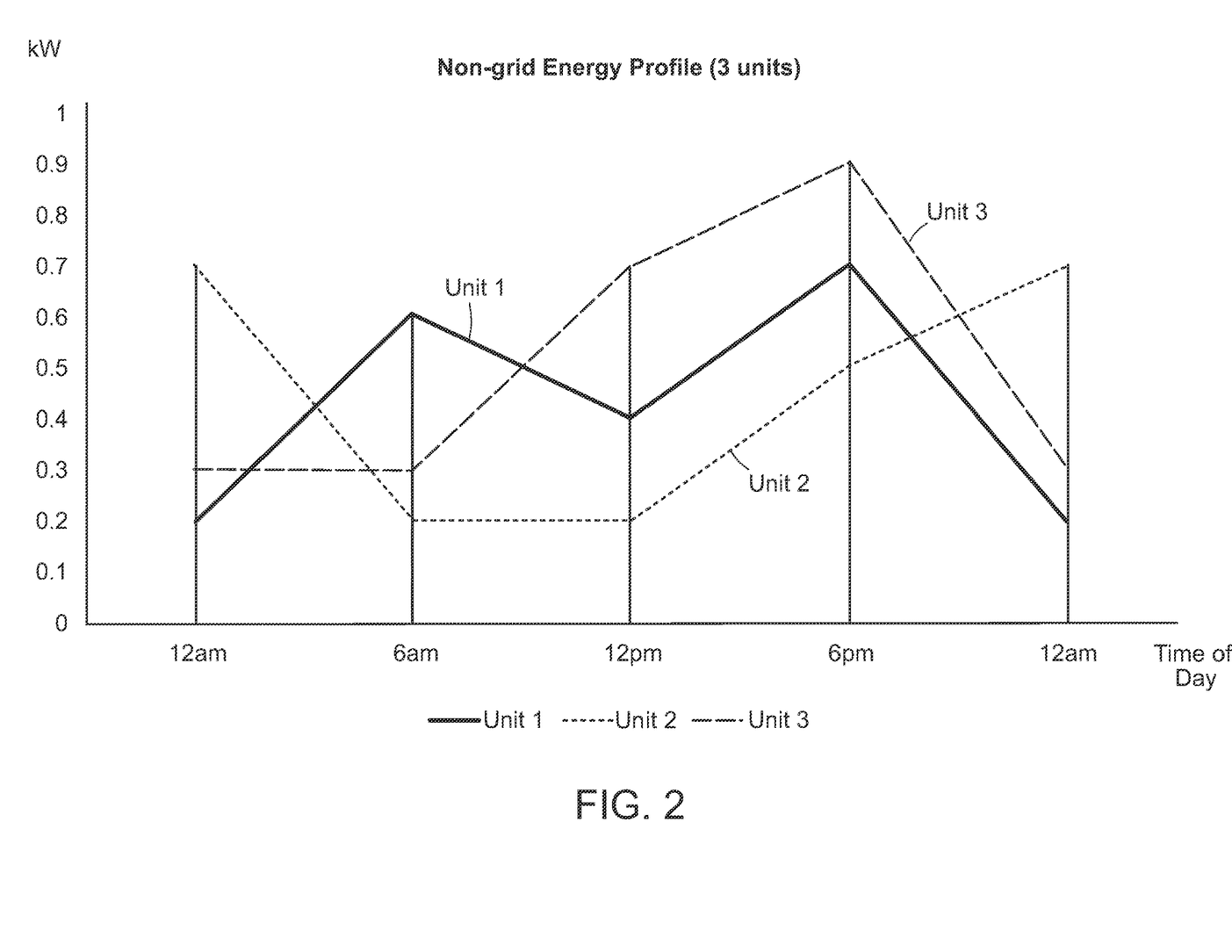
FIG. 2 is an embodiment of non-grid energy consumption profiles for three unit in a multi-unit dwelling, in accordance with aspects of the inventive concepts.

FIG. 2 is an embodiment of non-grid energy consumption profiles for three units in a multi-unit dwelling, in accordance with aspects of the inventive concepts. In this embodiment, the vertical y-axis represents kiloWatts (kW) and the horizontal x-axis represents time of day, for a single day. As can be seen, each unit has a different non-grid energy consumption profile. Unit 1 usage peaks at 6 am and then again at 6 pm. Unit 2 usage peaks around midnight. And Unit 3 usage peaks around 6 pm. This information can be used to determine highest demand used in dynamic (flexible, or time dependent) pricing of non-grid energy in the marketplace system 100.

Figure 3:
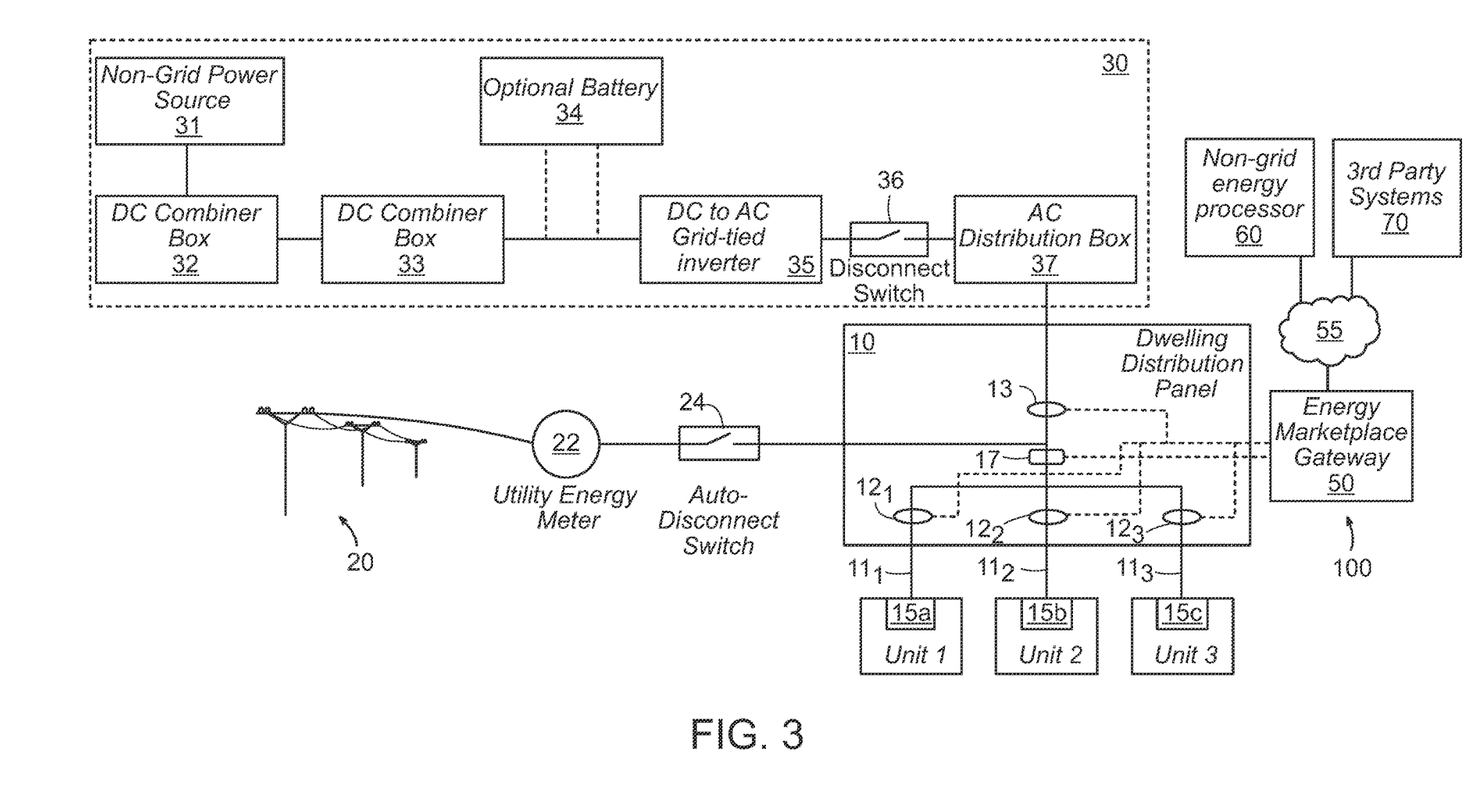
FIG. 3 provides an embodiment of a non-grid energy system within the context of a multi-unit hybrid energy system, in accordance with aspects of the inventive concepts.

FIG. 3 provides an embodiment of a non-grid energy marketplace system 100 within the context of a multi-unit hybrid energy system, in accordance with aspects of the inventive concepts. In FIG. 3, a more detailed depiction of the non-grid system 30 is provided and a multi-unit configuration is more explicitly shown.

The grid system 20 is as described in FIG. 1, although a utility meter 22 and an auto-disconnect switch 24 are shown in this embodiment. In this embodiment, there is a single meter 22 for the grid energy, but a different electric panel 15a,b,c for each of the Units 1, 2, 3.

The non-grid system 30 includes a non-grid power source 31, e.g., solar panels, that generates DC (direct current) energy from sunlight. The DC power from all non-grid power sources, e.g., a plurality of solar panels, is fed to a DC combiner box 32, which aggregates the DC voltage and feeds it to a DC distribution box 33 for distribution to either a battery system 34 for storage and later use or to a DC-to-AC grid-tied inverter 35 for immediate use. The DC-to-AC grid-tied inverter 35 transforms the DC power into AC power and sends it, via a disconnect switch 36, to an AC distribution box 37. If the switch 36 is open, the voltage from the DC distribution box 33 is stored in the battery system 34. If the switch 36 is closed, DC current flows either from the DC distribution box 33 or from the battery system 34 to the DC-to-AC grid-tied inverter 35. From the AC distribution box 37, an AC current flows to the dwelling distribution panel 10 for use by one or more units.

In FIG. 3, the three units, Unit 1, Unit 2, and Unit 3+, are shown, but there could be more than 3 units in this or other embodiments. Each unit has its own unit electric panel 15a, 15b, 15c, which is connected to the main distribution panel 10 via sets of legs $11_1$, $11_2$, and $11_3$, respectively. In a 2-phase arrangement, the sets of legs $11_1$, $11_2$, and $11_3$ each comprises 2 legs, as described with respect to FIG. 1. In this embodiment, each of the sets of legs $11_1$, $11_2$, and $11_3$ includes at least one current sensor $12_1$, $12_2$, and $12_3$, respectively. If a set of legs includes 2 legs, then in various embodiments each of the two legs will include at least one sensor, as described with respect to FIG. 1.

In this embodiment, the output of the AC distribution box 37 of the non-grid system 30 includes a current sensor 13, as in FIG. 1. A volt meter 17 is provided to sense a hybrid voltage from the grid system 20 and the non-grid system 30 out of the distribution panel 10.

As in FIG. 1, in FIG. 3 the sensors 13, $12_1$, $12_2$, and $12_3$, are coupled to the energy marketplace gateway 50, as is the volt meter 17. The energy marketplace gateway 50 is configured to collect and process time-series energy data from information provided by the sensors. The non-grid energy information processor 60 and the energy marketplace gateway 50 can be configured to communicate and exchange data via a network 55, e.g., the Internet and/or World Wide Web. The non-grid energy information processor 60 receives the time-series energy data for a site that has at least one non-grid energy system 30. In various embodiments, the time-series energy data includes unit-level non-grid energy consumption data and, in the case of a hybrid system with a grid energy source, unit-level grid energy consumption data, for each unit (Unit 1, Unit 2, Unit 3+) at the site. The non-grid energy information processor 60 can be configured to store and/or represent the time-based non-grid energy consumption information for each unit as one or more energy consumption profiles, e.g., a non-grid energy consumption profile (see FIG. 2) and/or a total or hybrid energy consumption profile on a unit-level basis (for each unit) and/or for a plurality of units, such as a plurality of units for a site.

Accordingly, in various embodiments, the non-grid energy marketplace system 100 collects energy production data for non-grid energy sources along with consumption data of both non-grid and grid energy by units. The data collected and analyzed by the system in the preferred embodiment may include main-line voltages, current, phase, and other metrics needed for the accurate calculation of energy flow through power lines or other electrical transmission equipment.

In various embodiments, energy data can be aggregated, from various sensors, at the internet-connected gateway 55. Time-series power consumption data calculated from the sensors can be used to provide detailed information on individual unit power consumption, e.g., at the unit level.

In various embodiments, with information about a multi-unit's non-grid energy use and/or production, including details on the quantity and timing of the energy production, the system 100 combines this information with individual units' consumption to determine the total power consumption at an individual unit level and associates the consumed energy sourcing.

Table 1 below provides an example of grid consumption for one unit (e.g., Unit 1) for a month and the source it came from, i.e., grid 20 or non-grid 30:

TABLE 1

|  | Power Used per Unit Kilo Watt Hours (kWh) |
| --- | --- |
| Power from battery (kWh) | 28.30 |
| Power direct from non-grid source | 32.38 |
| Power from utility grid | 106.12 |
| Power to utility grid | — |

Table 1 also shows power returned to grid 20, which would be unused power from the non-grid system 30. In this example, there was no excess power to return to the grid 20 from the non-grid system 30.

In various embodiments, the non-grid energy processor 60 can be configured to communicate and exchange information with one or more $3^{rd}$ party systems 70, via network 55. Third-party systems 70 can include, but are not limited to, financial institutions, consumers, operators, building owners, asset owners, asset investors, asset manufacturers, distributers and/or maintainers, energy and/or utility companies, governmental authorities, energy consortiums or exchanges, and/or any other entity involved in the consumption, production, investment, financing, and/or regulation of or in grid energy and/or non-grid energy and the assets used to produce, deliver, manage, and pay for the same, as examples, all of which can form part of the community.

In some embodiments, the non-grid energy processor 60 can include or have access to stored information identifying non-grid energy assets, such as solar panels, batteries, software versions, etc. The non-grid energy asset information can include the make, model, and installation or manufacturing date of the assets, and could also include usage information and/or performance information for each non-grid energy asset. The accurate valuation of source and marketplace assets can be derived from the asset's hardware components, age, production history, consumption history, and other factors. The asset valuation provides investment performance information in a form easily translated to state and federal tax filings and authorities for different jurisdictions including, but not limited to, the USA. The non-grid energy asset information can be stored and/or accessed for a plurality of sites, via a plurality of gateways 50.

The non-grid energy processor 60 can be configured to determine values of the various non-grid energy assets based on the non-grid energy asset information, and can interface and communicate with various $3^{rd}$ party systems 70 to obtain and/or determine assets values. The non-grid energy processor 60 could additionally establish and maintain a marketplace for the sale and/or leasing of non-grid energy assets, which could be hosted by the non-grid energy processor 60 or a $3^{rd}$ party system 70. The non-grid energy processor 60 could also be configured to communicate with operators to advise of asset obsolescence, degradation, under performance, or failure, purchase or lease offers, and/or upgrade opportunities.

The marketplace system 100 can be configured, therefore, to perform asset valuation that automatically determine source and marketplace asset values, whereby source and marketplace assets can be valued transparently in real-time to enable their sale and purchase by investors.

In various embodiments, the market place system 100, e.g., processor 60, can include a machine learning (ML) application that is executable to allow the marketplace system 100 to take in historical, time-series data on non-grid energy sourcing and pricing and community member consumption to adjust deployment-specific pricing strategies to optimize the return of the non-grid energy source.

In various embodiments, therefore, the non-grid energy marketplace system 100 allows dynamic price setting for consumers of power produced from non-grid energy systems 30 to incentivize units to consume power during times beneficial for the non-grid energy source and the community members. The marketplace system 100, in various embodiments, provides access to a real-time, dynamic pricing system to optimize the usage of power from the non-grid energy source.

In various embodiments, the non-grid energy marketplace system 100 allows for operators or potential operators, with or without ownership interest of unit(s), to:
  Invest in non-grid energy production assets
  Receive compensation for non-grid energy utilization
  Receive accurate asset valuation of the non-grid energy asset based on asset hardware, age, usage, production history, utilization history, and other factors
  Sell investments in non-grid production assets informed or enabled by the marketplace.

In various embodiments, the non-grid energy system includes software, wherein payments required for consumption, production, and asset sharing can be communicated, paid, and received in a secure fashion to and from individual community members and asset owners/operators, e.g., using electronic funds transfers. The marketplace system 100 can be configured to allow for unit energy sourcing by specific source at specific times or via a dynamically or planned energy release to optimize operator(s) financial performance via inputs from sensors, community member input, and real time production and use data.

In various embodiments, the non-grid energy marketplace system 100 provides a marketplace for payment for consumers and asset owners that includes, but is not limited to, a system that tracks time-series, individual community member power consumption and determines the allocation of non-grid vs grid power consumption; a system that summarizes individual community member power consumption into a bill for payment through the marketplace system 100; a system that allows operators to determine time-sensitive non-grid energy pricing strategies to increase the overall utilization and return of the system; and a system that allows for interaction with energy consumers to reserve certain discounted power rates for specific times and quantities to increase overall utilization of the system.

Figure 4:
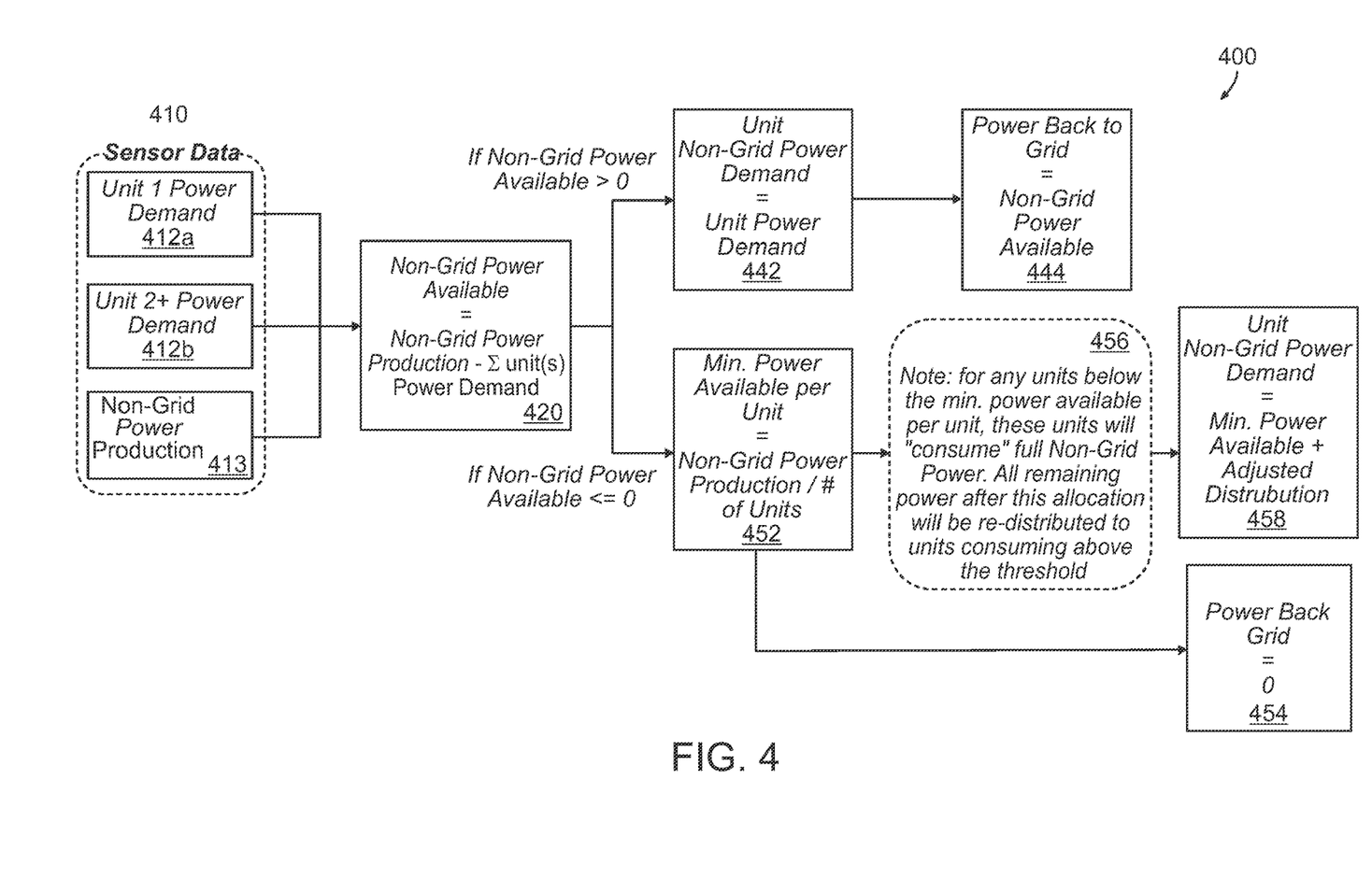
FIG. 4 provides an embodiment of a method of non-grid energy net-power consumption and distribution, in accordance with aspects of the inventive concepts.

FIG. 4 provides an embodiment of a method 400 of non-grid energy net-power consumption and distribution that can be performed by the non-grid energy marketplace system 100, in accordance with aspects of the inventive concepts.

In step 410, sensor data is collected, e.g., current and/or voltage sensor data. For example, in step 412*a*, sensor data can be collected for Unit 1 from sensors $12_1$ and in step 412*b* sensor data can be collected for Unit 2 from sensors $12_2$. This could be done for each of N units, e.g., simultaneously. In step 413, sensor data can be collected from sensor 13 to determine the output energy from the non-grid system 30.

In step 420, the system 100 determines the amount of non-grid power available, which is calculated as the non-grid power produced (from sensor 13) from non-grid system 30 less the power demand of the N units (from sensors $12_{1,2,3}$). These units will typically be in kW.

If there is available non-grid power (>0), then the method continues to step 442, where the unit power demand is met by the available non-grid power. If there remains additional non-grid power after that, the excess non-grid power can be made available via the grid in step 444.

However, if it is determined coming out of step 420 that the available non-grid power is less than the unit power demand, the method continues to step 542, where the available non-grid power is allocated among the N units. The allocation can be equal, i.e., evenly dividing and distributing the available non-grid power by and among the number of units N In other embodiments, the non-grid power can be allocated differently, e.g., using the non-grid power to satisfy a uniform percentage of the power demanded by each unit. The percentage can be the amount of available non-grid power divided by the amount of power demanded by all N units. The allocation and distribution of the available non-grid power can differ in different embodiments. If all non-grid power is consumed in step 542, no power is returned to the grid in step 454.

In some embodiments, coming out of step 452, for any units below a minimum power available per unit threshold, these units will be allocated (and consume) full non-grid power, in step 456. All remaining power after this allocation will be redistributed to units consuming above the minimum power available per unit threshold, also in step 456. From step 456, the method continues to step 458 to make the unit non-grid power demand equal to the minimum power available plus the adjusted allocation and distribution.

As will be appreciated by those skilled in the art having the benefit of this disclosure, in accordance with the inventive concepts, the non-grid energy marketplace system 100 can be used for determining power usage from non-grid and grid power sources. The marketplace system can be used to establish an online or virtual marketplace wherein temporal (e.g., time-series) power consumption data from each unit will be compared to time-series power consumed from sources. The marketplace system 100 can be configured to track the overall quantity of power consumed by individual units from each power source.

In various embodiments, the information on power consumption by unit, by source will be used to generate consumption reports for each unit. This report will inform billing units for power consumed and accurately compensating sources. In accordance with aspects of the inventive concepts, a single-source marketplace for power consumption tracking and billing can be provided.

In various embodiments, by tracking temporal source production data and environmental factors versus current performance, the marketplace system 100 allows for maintenance alerts and provides inputs for asset valuations. Operators can also schedule standard maintenance and upkeep through the marketplace system 100.

In addition, the various embodiments, the marketplace system 100 allows for dynamic pricing by source for unit consumption. The dynamic pricing enables operators to incentivize desired power loads to optimize asset performance.

The marketplace system 100, in various embodiments, provides real-time, dynamic pricing where units can "reserve" power rates for a certain volume of power during a certain time period. Interaction with the marketplace will inform Machine Learning (ML) algorithms to optimize future pricing to increase the non-grid energy source's economic output.

In various embodiments, the marketplace system 100 can be configured to allow for the automatic real-time determination of operator and source asset valuations. Inputs to such valuation are, but are not limited to, system evaluation, performance data, weather and ecosystem actual and predicted behaviors, financial performance and energy pricing and trending data, unit-level characteristics, specific marketplace unit terms and conditions, grid interface data, system age, aggregated marketplace data from other deployments and marketplace financial data archives from the current marketplace generated to support any prior operators, units or community members. This valuation will enable informed up-front investment decisions by initial operators and enable an efficient marketplace through data driven asset pricing and asset component valuations for asset tranching among potential future investors or operators. The marketplace system 100 can be configured to provide both the data and platform to enable this efficient market investment and exchange.

In various embodiments, marketplace gateway 50 deployments will be facilitated by pre-deployment of easy to install, low cost, data gathering internet of things hardware and software marketplace assets to gather real-time and location specific data to inform prospective operators and community members. This data will inform marketplace system and source designs and facilitate investment decisions by owners and operators.

In various embodiments, the marketplace system 100 tracking capabilities can be used for the sharing of asset use, such as battery assets, among different operators to maximize collective returns and with grid energy providers via predefined decision criteria.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What I claim is:

1. A non-grid energy determination system, comprising:
   a plurality of unit sensors, each unit sensor configured to be disposed between a main distribution panel of a multi-unit site and an electric panel corresponding to one energy consuming unit of the multi-unit site comprising a plurality of energy consuming units,
   wherein the multi-unit site is a multi-unit building, dwelling, or complex and the plurality of energy consuming units are configured for human shelter, and
   wherein each unit sensor is configured to collect time-series energy consumption data, including time-series non-grid energy consumption data and time-series grid energy consumption data, for a corresponding energy consuming unit;
   a non-grid energy sensor coupled between a non-grid energy source and the main distribution panel and configured to collect time-series non-grid energy production data;
   a grid energy sensor coupled between a grid energy source and the main distribution panel and configured to collect time-series grid energy production data;
   a gateway coupled to the non-grid energy sensor, the grid energy sensor, and each of the plurality of unit sensors; and
   a non-energy processor coupled to the gateway and configured to receive and process the time-series energy consumption data, the time-series non-grid energy production data, and the time-series grid energy production data to determine time-based non-grid energy consumption for each of the plurality of energy consuming units.

2. The system of claim 1, wherein one or more of the plurality of unit sensors, grid energy sensor, and non-grid energy sensor includes current transformer (CT) sensors, voltage sensors, and/or magnetic field sensors.

3. The system of claim 1, wherein the non-grid energy sensor is disposed at an output of the non-grid energy system and each unit sensor is disposed on a leg coupling the main distribution panel to a corresponding electric panel for each of the plurality of energy consuming units at the site.

4. The system of claim 1, wherein the non-grid energy processor is further configured to process the time-series energy data to determine the time-series non-grid energy production data for the at least one non-grid energy system.

5. The system of claim 1, wherein the non-grid energy processor is further configured to process the time-series energy data to determine the non-grid energy consumption data and the grid energy consumption data on a temporal unit-level basis.

6. The system of claim 1, wherein the non-grid energy processor is further configured to:
   communicate with a plurality of gateways, each gateway coupled to a plurality of sensors configured to collect time-series energy data for each of the plurality of energy consuming units at a different site having a non-grid energy system; and
   determine valuations of non-grid energy assets of the non-grid energy systems.

7. The system of claim 6, wherein the non-grid energy processor is further configured to determine the valuations of the non-grid energy assets from a plurality of types of asset information, including an asset's hardware components, age, production history, and consumption history.

8. The system of claim 6, wherein the non-grid energy processor is further configured to establish an on-line marketplace that enables electronic transactions for purchase, sale, and/or investment in the non-grid energy assets.

9. The system of claim 1, wherein the non-grid energy processor is further configured to:
communicate with a plurality of gateways, each gateway coupled to a plurality of sensors configured to collect time-series energy data for each of the plurality of energy consuming units at a different site having a non-grid energy source;
determine time series non-grid energy production data for each site and unit-level time series energy consumption at each site; and
determine time-sensitive non-grid energy pricing based on the time series non-grid energy production data for each site and the unit-level time series energy consumption at each site.

10. The system of claim 9, wherein the non-grid energy processor is further configured to provide a non-grid energy marketplace for energy consumers that allows the energy consumers to reserve certain discounted power rates for specific times and quantities.

11. A non-grid energy determination method, comprising:
providing a plurality of unit sensors, including coupling each unit sensor between a main distribution panel of a multi-unit site and an electric panel corresponding to one of a plurality of energy consuming units of the multi-unit site,
wherein the multi-unit site is a multi-unit building, dwelling, or complex and the plurality of energy consuming units are configured for human shelter;
each unit sensor collecting time-series energy consumption data, including time-series non-grid energy consumption data and time-series grid energy consumption data, for a corresponding energy consuming unit;
collecting time-series non-grid energy production data using a non-grid energy sensor coupled between a non-grid energy source and the main distribution panel;
collecting time-series grid energy production data using a grid energy sensor coupled between a grid energy source and the main distribution panel;
coupling a gateway to the non-grid energy sensor, the grid energy sensor, and each of the plurality of unit sensors and to a non-grid energy processor; and
the non-grid energy processor processing the time-series energy consumption data, the time-series non-grid energy production data, and the time-series grid energy production data to determine time-based non-grid energy consumption for each unit.

12. The method of claim 11, wherein the non-grid energy sensor is disposed at an output of the non-grid energy system and each unit sensor is disposed on each leg coupling the main distribution panel to a corresponding electric panel for each of the plurality of energy consuming units at the site.

13. The method of claim 11, the non-grid energy processor processing the time-series energy data to determine the time-series non-grid energy production data for the at least one non-grid energy system.

14. The method of claim 11, the non-grid energy processor processing the time-series energy data to determine the non-grid energy consumption data and the grid energy consumption data on a temporal unit-level basis.

15. The method of claim 11, the non-grid energy processor:
communicating with a plurality of gateways, each gateway coupled to a plurality of sensors configured to collect time-series energy data for each of the plurality of energy consuming units at a different site having a non-grid energy system; and
determining valuations of non-grid energy assets of the non-grid energy systems.

16. The method of claim 15, the non-grid energy processor determining the valuations of the non-grid energy assets from a plurality of types of asset information, including an asset's hardware components, age, production history, and consumption history.

17. The method of claim 15, the non-grid energy processor establishing an on-line marketplace that enables electronic transactions for purchase, sale, and/or investment in the non-grid energy assets.

18. The method of claim 11, further including the non-grid energy processor:
communicating with a plurality of gateways, each gateway coupled to a plurality of sensors configured to collect time-series energy data for each of the plurality of energy consuming units at a different site having a non-grid energy source;
determining time series non-grid energy production data for each site and unit-level time series energy consumption at each site; and
determining time-sensitive non-grid energy pricing based on the time series non-grid energy production data for each site and the unit-level time series energy consumption at each site.

19. The method of claim 18, further including the non-grid energy processor providing a non-grid energy marketplace for energy consumers that enables the energy consumers to reserve certain discounted power rates for specific times and quantities.

20. The method of claim 11, wherein one or more of the plurality of unit sensors, grid energy sensor, and non-grid energy sensor includes current transformer (CT) sensors, voltage sensors, and/or magnetic field sensors.

* * * * *